US007138937B1

(12) United States Patent
Macdonald

(10) Patent No.: US 7,138,937 B1
(45) Date of Patent: Nov. 21, 2006

(54) RADAR SYSTEM HAVING LOW-PROFILE CIRCULATOR

(75) Inventor: Perry Macdonald, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/447,618

(22) Filed: Jun. 6, 2006

Related U.S. Application Data

(62) Division of application No. 10/864,159, filed on Jun. 9, 2004, now Pat. No. 7,078,983.

(51) Int. Cl.
*G01S 13/74* (2006.01)
*H01P 1/38* (2006.01)

(52) U.S. Cl. .......................... 342/42; 333/1.1; 342/175

(58) Field of Classification Search .................. 342/42, 342/175; 333/1.1
See application file for complete search history.

(56) References Cited

U.S. PATENT DOCUMENTS

| | | | | |
|---|---|---|---|---|
| 3,270,298 A | | 8/1966 | Seidel | |
| 3,309,698 A | | 3/1967 | Baldock | |
| 3,646,486 A | | 2/1972 | Wen | |
| 3,729,692 A | * | 4/1973 | Tanaka et al. | 333/1.1 |
| 3,952,262 A | * | 4/1976 | Jamison | 331/55 |
| 4,679,010 A | * | 7/1987 | Bahl | 333/109 |
| 5,304,999 A | * | 4/1994 | Roberts et al. | 343/778 |

OTHER PUBLICATIONS

Miura, T., "An Experimental High Isolation Ferrite Substrate Circulator Magnetized by Trigonally Symmetric Pole Pieces", Magnetics, IEEE Transactions on, vol. 8, Issue 3, Sep. 1972, pp. 509-510.*

Pan et al., "High Performance Millimeter-Wave Microstrip Circulator for Deep Space Communications", Microwave Symposium Digest, 1990., IEEE MTT-S International, May 8-10, 1990 pp. 1015-1017 vol. 3 □□.*

Oliver et al., "Integrated self-biased hexaferrite microstrip circulators for millimeter-wavelength applications" □□Microwave Theory and Techniques, IEEE Transactions on, vol. 49, Issue 2, Feb. 2001 pp. 385-387.*

Lang, J., "Interdigitated Stripline Quadrature Hybrid," IEEE Transactions on Microwave Theory and Techniques, Dec. 1969, pp. 1150-1151.

Lange Coupler Design, http://www.eagleware.com/pdf/apps/0010_AccuracyProofLange.pdf (14 pgs.).

Chen-Yu Chi and Gabriel M. Rebeiz, "Design of Lange-Couplers and Single-Sideband Mixers Using Micromachining Techniques," IEEE Transactions on Microwave Theory and Techniques, vol. 45, No. 2, Feb. 1997, pp. 291-294.

* cited by examiner

*Primary Examiner*—Ian J. Lobo
(74) *Attorney, Agent, or Firm*—Leonard A. Alkov; Karl A. Vick

(57) ABSTRACT

A circulator comprises first and second couplers. The first and second couplers are coupled by first and second transmission lines. First and second magnetic fields are provided crossing the first and second transmission lines, respectively. In an exemplary embodiment, the magnetic fields are substantially parallel with and within a plane defined by the first and second transmission lines.

9 Claims, 3 Drawing Sheets

RADAR SYSTEM HAVING LOW-PROFILE CIRCULATOR

CROSS REFERENCE TO RELATED APPLICATION

This is application is a Divisional Application of U.S. patent application Ser. No. 10/864,159, filed Jun. 9, 2004 now U.S. Pat. No. 7,078,983 by Perry Macdonald and is hereby incorporated by reference herein, in its entirety.

BACKGROUND OF THE DISCLOSURE

A transmit/receive module typically includes a circulator for coupling a power amplifier transmitter and a low noise amplifier receiver with an antenna. One common circulator implementation includes a microstrip circuit pattern on a ferrite substrate. A magnet provides a DC magnetic field for rotating the fields in the resonant portion of the microstrip pattern. The microstrip circuit pattern is laid out such that the required DC magnetic field is orthogonal to the plane of the substrate. The DC magnetic field is provided by a puck-shaped magnet placed on top of the circuit pattern and above the plane of the substrate. Having the required magnetic field orthogonal to the plane of the substrate results in the placement of the magnet above the plane of the micro-strip circuit. The transmit/receive module has a thickness equal at least equal to the thickness of the substrate plus the thickness of the magnet.

SUMMARY

A circulator comprises first and second couplers. The first and second couplers are coupled by first and second transmission lines. First and second magnetic fields are provided crossing the first and second transmission lines, respectively. In an exemplary embodiment, the magnetic fields are substantially parallel with and within a plane defined by the first and second transmission lines.

BRIEF DESCRIPTION OF THE DRAWINGS

Features and advantages of the disclosure will readily be appreciated by persons skilled in the art from the following detailed description of exemplary embodiments thereof, as illustrated in the accompanying drawings, in which.

DETAILED DESCRIPTION OF THE DISCLOSURE

Figure 1:
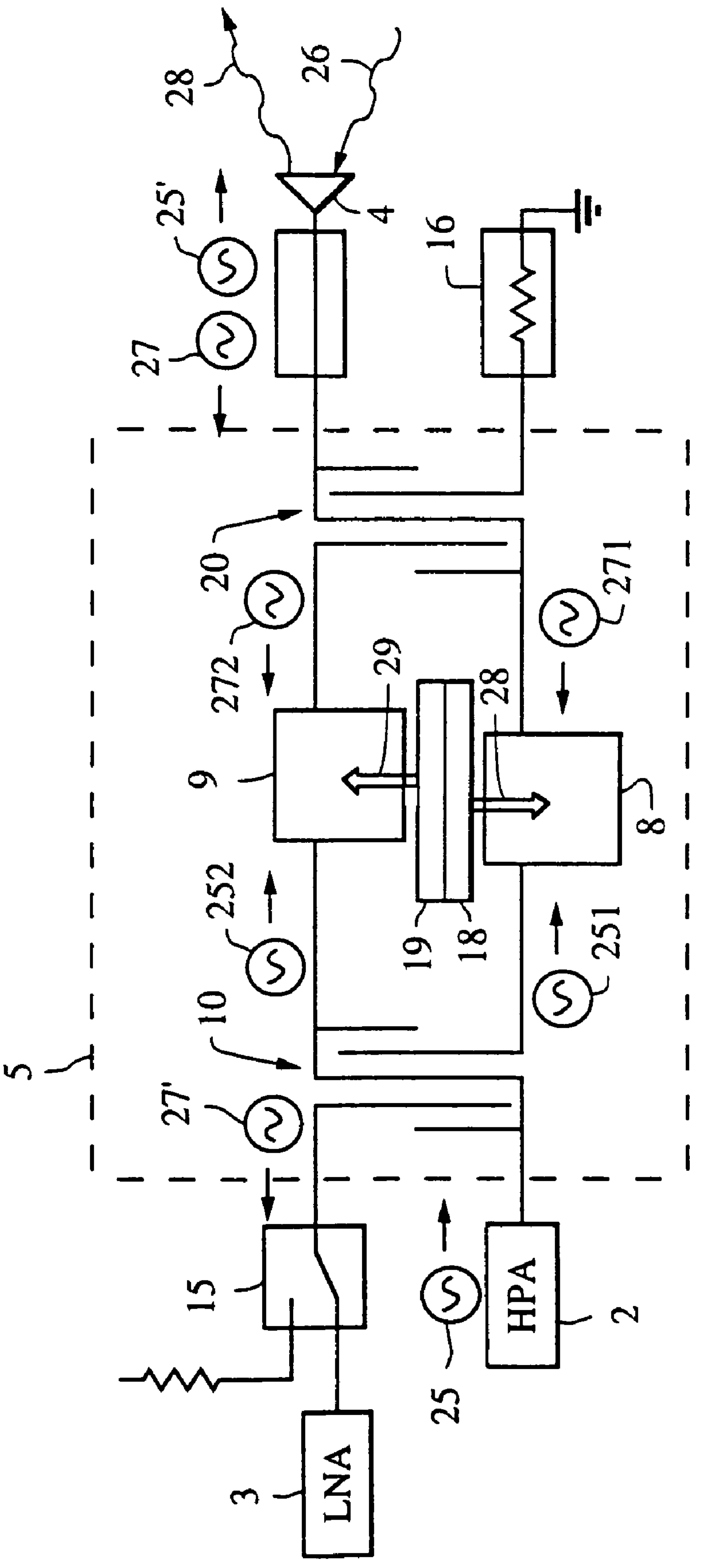
FIG. 1 illustrates an exemplary schematic circuit diagram of an exemplary embodiment of an antenna system.

In the following detailed description and in the several figures of the drawing, like elements are identified with like reference numerals.

FIG. 1 illustrates an exemplary schematic circuit diagram of an exemplary embodiment of an antenna system 1. The antenna system comprises a transmit amplifier 2 and a receive amplifier 3. In an exemplary embodiment, the transmit amplifier 2 comprises a high power amplifier. In an exemplary embodiment, the receive amplifier 3 comprises a low noise amplifier. The transmit amplifier 2 and the receive amplifier 3 are coupled to a radiating element or antenna 4 through a circulator 5.

In the exemplary embodiment of FIG. 1, the antenna system 1 comprises a radar system. The transmit amplifier 2 provides a transmit signal 25. The transmit signal 25 may comprise a high frequency signal. The upper limit of the frequency may be determined by the material used for the transmission lines 8, 9. The lower frequency may be dictated by the size limitations or demands of a particular application. In an exemplary embodiment, the transmit signal 25 has a frequency range of about 10 GHz to 20 GHz. In another exemplary embodiment, the transmit signal 25 has a frequency range between about 6 GHz to 12 GHz. The transmit signal may comprise a radar transmit signal for driving an antenna 4 to transmit a radar pulse 28. In an exemplary embodiment, the antenna system comprises an array of radiating elements, and a corresponding plurality of transmit amplifiers, circulators and receive amplifiers.

In the exemplary embodiment of FIG. 1, the antenna 4 receives a return signal 26 and provides a receive signal 27 responsive to the return signal 26. The return signal 26 may, for example, comprise a return echo from the transmitted radar pulse 28. The circulator 5 routes the receive signal 27 to the receive amplifier 3.

Figure 3:
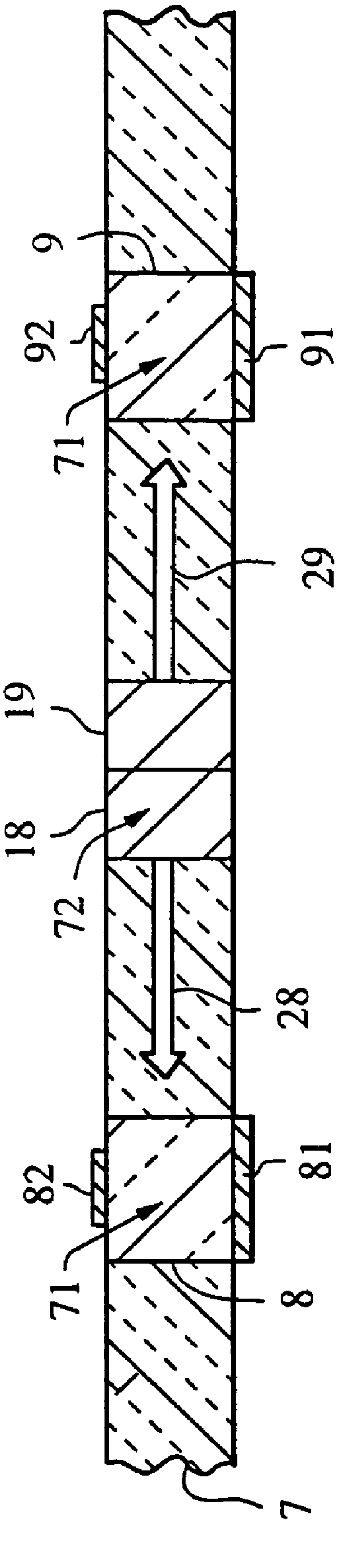
FIG. 3 illustrates a cross-sectional view of an exemplary embodiment of a circulator of FIG. 2.

In an exemplary embodiment, the circulator 5 comprises first and second couplers 10, 20 connected by transmission lines 8, 9. The first and second couplers 10, 20 and the transmission lines 8, 9 are substantially in the same plane. The couplers 10, 20 comprise interdigitated microstrip couplers or Lange couplers. Lange couplers are described, for example, in Lange, J., "Interdigitated Stripline Quadrature Coupler," IEEE Transactions on Microwave Theory and Techniques, December 1969, pages 1150–1151. In an alternate embodiment, the couplers may comprise a different type of coupler, including, for example, a quadrature coupler. The couplers 10, 20 may comprise, for example, conductive traces formed on a dielectric substrate 7 (FIG. 3). The traces can comprise gold, copper or other metal or low-loss material. The conductive traces can be fabricated onto the substrate 7, for example, by printing, plating or other thin film or photolithographic technique. The substrate 7 may comprise alumina, silicon, gallium arsenide, a printed circuit board or other low-loss dielectric material. The substrate may be, for example, in a range of about 0.005" to 0.125" thick.

The transmission lines 8, 9 are non-reciprocal in that they provide different phase responses for signals propagating in different directions across the same transmission line. Non-reciprocal transmission lines 8, 9 may comprise, for example, anisotropically permeable material under the influence of opposed magnetic fields 28, 29. For example, the transmission lines 8, 9 may comprise anisotropically permeable material such as, for example, ferrite loaded transmission lines. In an exemplary embodiment, the transmission lines 8, 9 are placed into holes 71 (FIG. 3) cut into or through the substrate and may be epoxied into place. The transmission lines 8, 9 may comprise a substrate 7 comprising ferrite material with external surfaces which are metalized with a groundplane layer 81, 91 on one side and a microstrip line 82, 92 on the other side (FIG. 3). The external surfaces can be metalized, for example, with gold.

Figure 2:
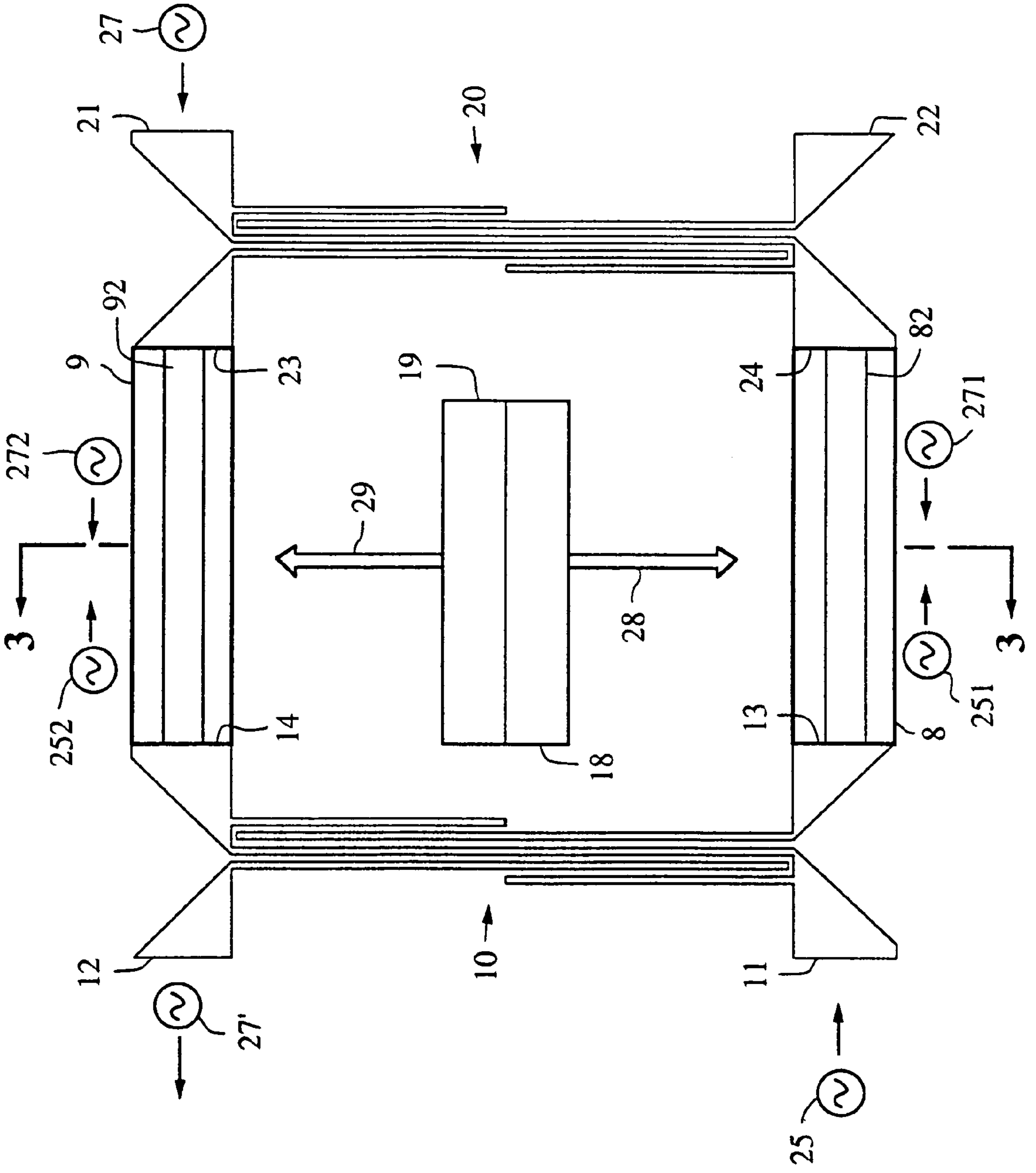
FIG. 2 illustrates an exemplary embodiment of a circulator.

In an exemplary embodiment, DC magnetic fields 28, 29 are provided acting in opposite directions along the plane defined by the couplers 10, 20 and the transmission lines 8, 9. The magnetic fields 28, 29 may be substantially orthogonal to the length of the transmission lines 8, 9 as shown in FIG. 2. In an exemplary embodiment, the magnetic fields 28, 29 are provided by two magnets 18, 19 placed back-to-back. The magnets 18, 19 may comprise, for example, permanent magnets or bar magnets or any other appropriate magnetic field source.

The opposed magnetic fields 28, 29 cause the anisotropic permeability of the transmission lines 8, 9 to align in opposite directions. The magnetic fields 28, 29 align the permeability tensors of the respective transmission lines 8, 9 so that the left-to-right permeability (or transmit permeability) for signals 251, 252 propagating from coupled port 13 or 14 to coupled port 24 or 23, respectively, is different from the right-to-left permeability (or receive permeability) for signals 271, 272 propagating from coupled port 24 or 23 to coupled port 13 or 14, respectively.

For example, the permeability of the transmission line 8 for the signal 251 may be higher than the permeability of transmission line 8 for the signal 271, whereas the permeability of the transmission line 9 may be higher for the signal 272 than for the signal 252. In an alternate embodiment, the relative permeability of the transmission lines with respect to the direction of signal travel may be reverse. The transmission lines 8, 9 are selected to achieve the desired phase-shift and phase relationships among the signals 251, 252, 271, 272 as further described below. Suitable transmission line structures may include, for example, microstrip, dielectric guide and inset dielectric guide transmission lines. An inset dielectric guide may comprise a rectangular groove in a metal slab with layers of dielectric and/or ferrite material placed in the groove. The sidewalls of the groove can support a material layer above another to allow for a layer of air to be used as part of the transmission line. A variety of transmission characteristics can be obtained by layering the materials in this fashion.

In an exemplary embodiment, the first coupler 10 receives the transmit signal 25 at the input port 11 and divides the signal into two signals, 251 and 252. The signal 251 is routed to the coupled port 13, through the transmission line 8 to the coupled port 24 of the second coupler 20. The signal 252 is routed to the coupled port 14, through the transmission line 9 to the coupled port 23. The signal 251 at the coupled port 13 is substantially in phase with the signal 252 at the coupled port 14.

The left-to-right or transmit permeability of transmission line 8 for the signal 251 is substantially equal to the left-to-right or transmit permeability of the transmission line 9 for the signal 252. As a result, the signals 251 and 252 have a substantially equivalent phase shift across the equal length transmission lines 8, 9, respectively, so that the signals 251 and 252 are substantially in-phase at the coupled ports 24, 23. The second coupler 20 combines the in-phase signals 251 and 252 into the signal 25', corresponding to the transmit signal 25, and routes the signal 25' out through the input port 21.

In an exemplary embodiment, the second coupler 20 receives the receive signal 27 at the input port 21 and divides the signal into two signals 271, 272. The signal 271 is routed to the coupled port 24, through the transmission line 8 to the coupled port 13 of the first coupler 10. The signal 272 is routed to the coupled port 23, through the transmission line 9 to the coupled port 14 of the first coupler 10. The signals 271 and 272 are substantially in-phase at the coupled ports 24 and 23, respectively. The transmission lines 8 and 9 and the magnetic fields 28, 29 are configured so that the receive permeability for right-to-left signals 271, 272 through transmission lines 8 and 9 causes signals 271 and 272 to be 180 degrees out of phase at the coupled ports 13 and 14, respectively.

In an exemplary embodiment, the right-to-left or receive permeability of the transmission line 8 causes a phase shift in the signal 271, propagated between coupled ports 24 and 13, which is 90 degrees greater than the phase shift of the signal 251 propagated between coupled ports 13 and 24. The right-to-left or receive permeability of the transmission line 9, on the other hand, causes a phase shift in the signal 272 propagated between coupled ports 23 and 14 which is 90 degrees less than the corresponding phase shift in the signal 251 propagated between coupled ports 14 and 23. In an alternate embodiment, the relative plus or minus 90 degree phase shift relationship for transmitted or received signals through the transmission lines 8, 9 may be reversed. In either case, the signals 271 and 272 are substantially 180 degrees out of phase when received at the coupled ports 13 and 14, respectively. The first coupler 10 combines the out-of-phase signals 271 and 272 into the signal 27', corresponding to the receive signal 27, which is routed out through the isolated port 12 to the receive amplifier 3.

In an exemplary embodiment, the receive amplifier 3 is connected to the circulator 5 through a switch 15 (FIG. 1). The switch 15 may be, for example, a single pole double throw (SPDT) switch. During use, the switch 15 may be normally in the closed position, but can be opened to protect the receive amplifier 3 when the magnitude of the receive signal 27 is too high or during transient operations. For example, in the case of radar, the switch 15 can be opened where the radar frequency is being actively jammed. In an alternate embodiment, the circulator 5 can be connected directly to the receive amplifier. In an alternate, exemplary embodiment, the circulator may be connected to the receive amplifier without a switch 15.

In an exemplary embodiment, the isolated port 22 of the second coupler 20 may be connected to a termination or load 16 (FIG. 1) for absorbing any reflections from the low noise amplifier. For example, if the transmit amplifier 2 and the receive amplifier 3 are turned off, the reflection of receive signals 27 from the antenna 4 may be predominantly controlled by the termination 16. The termination 16 can be selected to dissipate or reflect and received signals in a controlled manner and can be used for power dissipation and/or tuning.

FIG. 2 illustrates an exemplary embodiment of a circulator 5. The circulator comprises first and second couplers 10, 20. The couplers 10, 20 comprise Lange couplers. The couplers 10, 20 are fabricated on a substrate 7 (FIG. 3). In an exemplary embodiment, the couplers may be about 135 mils long. The length may be selected based, at least in part, on the operating frequency of the circulator 5.

In an exemplary embodiment, the first coupler 10 comprises an input port 11, an isolated port 12 and two coupled ports 13, 14. The second coupler 20 comprises an input port 21, an isolated port 22 and two coupled ports 23, 24. The coupled port 13 of the first coupler is connected to the coupled port 24 of the second coupler 20 by a transmission line 8. The coupled port 14 of the first coupler 10 is connected to the second coupled port 23 of the second coupler 20 by a transmission line 9.

The circulator 5 also comprises anisotropically permeable transmission lines 8, 9 connecting coupled ports 13, 14 with coupled ports 24, 23, respectively. Magnets 18, 19 provide opposed magnetic fields 28, 29, respectively. The magnetic fields 28, 29 are substantially orthogonal with the length of the transmission lines 8, 9, respectively. The magnetic fields 28, 29 bias the transmission lines 8, 9 so that the transmit permeability of the transmission lines 8, 9 for left-to-right propagating signals 251, 252 are different from the receive permeability for right-to-left propagating signals 271, 272.

In an exemplary embodiment, the transmission lines and magnetic field strengths are chosen so that the magnetic bias causes signals 251, 252, 271, 272 to have the desired phase-shift and phase relationships. In this embodiment, both transmission lines 8, 9 provide the same phase shift Ø L-R, to signals propogating from left to right in FIG. 1. One transmission line 8 or 9 will provide a phase shift to signals propogating from right to left which is 90 degrees more than Ø L-R and the other transmission line 9 or 8 will provide a phase shift to right to left propagating signals which is 90 degrees less than Ø L-R. This will provide signals at coupled ports 13, 14 of coupler 10 which are 180 degrees out of phase, which will cause the coupler 10 to route the signals at ports 13, 14 to port 12. For example, signals 251, 252 are in-phase at coupled ports 13, 14 and at coupled ports 24, 23, signals 271, 272 are in-phase at coupled ports 24, 23 and are 180 degrees out of phase at coupled ports 13, 14. The receive phase shift of signals 271, 272 across transmission lines 8 and 9 are 90 degrees more or less than the transmit phase shift of signals 251, 252 across their respective transmission lines 8, 9.

The length of the transmission lines 8, 9 are selected so that the transmit signals are routed from the input port 11 of the first coupler 10 and out the input port 21 of the second coupler and so that a receive signal 27 is routed from the input port 21 of the second coupler 10, divided into signals 271 and 272 and recombined into signal 27', corresponding to the receive signal 27, at the isolated port 12 of the first coupler 10. The length of the transmission lines 8, 9 are also selected so that the signals 251, 252 and 271, 272, respectively, have the desired, relative receive (right-to-left) and transmit (left-to-right) phase-shift relationships, and so that the signals 251, 271 and 252, 272 have the desired in-phase or out-of-phase relationships at the coupled ports 13, 14 and 24, 23, respectively. The lengths of the transmission lines 8, 9 may be selected, for example, at least in part based on the frequency of the signals 25, 27 to be transmitted and received through the circulator 5. In an exemplary embodiment, the effective electrical length of the transmission lines 8, 9 is about one quarter of a wavelength at the center of the operating frequency range.

FIG. 3 illustrates a cross-sectional view of an exemplary embodiment of a circulator of FIG. 2. The circulator comprises a substrate 7, magnets 18, 19 which generate opposed magnetic fields 28, 29, and transmission lines 8, 9. In the exemplary embodiment of FIG. 3, the transmission lines 8, 9 are metalized with ground planes 81, 91 and microstrip lines 82, 92. The couplers 10, 20 (FIG. 2) are fabricated on a surface of the substrate 7.

In an exemplary embodiment, the transmission lines 8, 9 are placed into holes 71 cut into or through the substrate and may be epoxied into place. The transmission lines 8, 9 may be about 10 mils thick (in a direction orthogonal to the surface of the substrate 7), 40 mils wide and 500 mils long (in a direction from a coupled port of one coupler to the corresponding coupled port of the other coupler.

In an exemplary embodiment, the magnets 18, 19 may be, for example, as thick as the substrate or about 10 mils thick, as long as the transmission lines or about 500 mils long, and sufficiently wide to generate sufficient magnetic field strength to provide the desired phase-shift and phase relationships among the signals 251, 252, 271, 272. In an exemplary embodiment, the magnetic field strength is about 3500 Gauss. The magnets 18, 19 may be placed into a hole 72 or holes cut into or through the substrate 7 and may be epoxied into place.

In an exemplary embodiment, having the magnetic fields act along the plane of the circuit provides a lower-profile, reduced-thickness circulator circulator 5 for a given application when compared with circulators with a magnet above or below the plane of the substrate. Having the magnetic fields 28, 29 act along the plane of the circuit permits placement of the magnets 18, 19 in the same plane as the transmission lines and/or in the substrate, as shown in FIG. 3. The resultant low-profile circulator 5 may not be as thick as a circulator in which the required magnetic fields are orthogonal to the plane of the substrate and the magnet placed outside the plane of the substrate. In an exemplary embodiment, the circuit need not be strictly planar. The circuit may be provided on a surface that conforms to a contour, for example a gently curving surface, but where the magnetic fields 28, 29 and the transmission lines 8, 9 are substantially in the same plane such that the circulator 5 performs the desired functions.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A radar system comprising:
- a transmit amplifier connected to a circulator for transmitting a transmit signal;
- a receive amplifier connected to the circulator for receiving a received signal;
- a radiator and a receiver connected to the circulator for radiating an output signal responsive to the transmit signal and generating the received signal responsive to an input signal;
- wherein the circulator comprises first and second couplers, wherein the couplers are formed on a substrate and coupled by first and second transmission lines, and the circulator comprises first and second magnets arranged between the first and second couplers and between the first and second transmission lines, the first magnet providing a first magnetic field substantially orthogonal to the first transmission line and parallel with a plane defined by the substrate and the second magnet providing a second magnetic field substantially orthogonal with the second transmission line and substantially parallel with and within the plane.

2. The radar system of claim 1, wherein the first and second couplers are Lange couplers.

3. The radar system of claim 1, wherein the substrate comprises a dielectric.

4. The radar system of claim 3, wherein the substrate comprises alumina.

5. The radar system of claim 1, wherein the first and second transmission lines comprise anisotropically permeable material.

6. The radar system of claim 5, wherein the first and second transmission lines are ferrite loaded.

7. The radar system of claim 1, wherein the first magnet and the second magnet comprise permanent magnets.

8. The radar system of claim 7, wherein the first magnet and the second magnet comprise bar magnets.

9. The radar system of claim 1, wherein the first magnet is in a hole in the substrate and the second magnet is in a hole in the substrate.

* * * * *